Patented Nov. 29, 1949

2,489,526

UNITED STATES PATENT OFFICE 2,489,526

AMINO PYRIMIDINES

Albert Frederick Crowther, Francis Henry Swinden Curd, Barbara Jean Lovell, and Harry Tacon Openshaw, Manchester, and Alexander Robertus Todd, Cambridge, England, assignors to Imperial Chemical Industries Limited, a corporation of Great Britain No Drawing. Application November 7, 1946, Serial No. 708,436. In Great Britain November 12, 1945

5 Claims. (Cl. 260—251)

This invention relates to the manufacture of new pyrimidine compounds which are useful as chemotherapeutic agents, especially as antimalarial agents, and also as intermediates for the manufacture of chemotherapeutic agents.

The said new compounds are pyrimidine derivatives of the formula

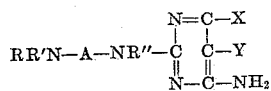

wherein X is hydrogen or a hydrocarbon radical, Y is hydrogen or a neutral substituent, and also X and Y may together form a single alkylene chain, R'' is hydrogen or an alkyl or simply substituted alkyl group, for example, an alkoxyalkyl or dialkylaminoalkyl group, A is a linking group which is aliphatic or alicyclic or aliphatic-carbocyclic and may be substituted, for example, by hydroxy, alkoxy or dialkylaminoalkyl groups and, where A or part of A is an aliphatic chain it may be interrupted by oxygen, sulphur or nitrogen atoms and NRR' is an amino or substituted amino group such as acylamino, alkylamino or dialkylamino or piperidino or other strongly basic nitrogen-containing heterocyclic group.

We make the said compounds by a process comprising the interaction of a compound of the formula

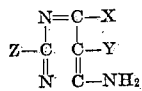

with a diamine NHR''—A—NRR', the various symbols in these formulae having the same meanings as before and Z representing a labile group such as a halogen atom or a hydrocarbon radical which is attached by means of an ether, or thioether linkage, for example, an alkoxy, aryloxy or alkylmercapto group.

The reaction is conveniently brought about by heating the reagents together, optionally in the presence of a solvent or diluent. The two reagents may both be used as free bases, or, if desired, the aminopyrimidine derivative may be used as the free base and the diamine in the form of a salt, for instance the hydrochloride, or acetate, or the diamine may be used as free base and the aminopyrimidine derivative as a salt. Also if desired the reaction may be carried out in the presence of an acid-binding agent such as sodium hydroxide.

The reagents are conveniently, but not necessarily used in approximately stoichiometric proportions. If desired a large excess of the diamine may be used so that it functions as a solvent; indeed with the diprimary diamines it is preferable to work in this way.

It will be appreciated that where it is desired to introduce a substituent of the form

—NR''—A—NHR (R being hydrogen or a hydrocarbon radical) it will usually be necessary first to protect the amino group NHR, as by acylation, and then to remove the protecting group after the condensation with the aminopyrimidine compound has been effected. This procedure is, in fact, a particular embodiment of one of the modified procedures now to be described.

A further feature of the invention is a modified process wherein the basic substituent —NR''—A—NRR' is introduced by stages. Thus the 2-aminopyrimidine derivative carrying a labile group in the 4-position is brought into reaction with an amino compound of the formula NHR''—A'—B, where A' represents either the whole or part of the linking group defined above and where B stands for a reactive group which is then converted directly or indirectly by methods involving the step of reaction with ammonia or a compound containing an amino group into the group NRR' or into a group —A''—NRR' such that A' and A'' together constitute the linking group A. For example, the group B may be a hydroxy group or a derivative thereof which is, or is readily convertible to, a reactive ester thereof, such as a halide, this then being brought into reaction with an amine NHRR' or an amino substituted amine NH₂—A'''—NRR' or a hydroxy or mercapto substituted amine

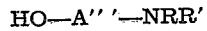

or HS—A'''—NRR' (or an alkali metal derivative of such a hydroxy or mercapto compound) such that A'—NH—A''', A'—O—A''' or A'—S—A''' constitutes the linking group A previously mentioned. Another alternative is to bring the labile group in the 4-position of the aminopyrimidine compound into reaction with an acylated diamine NHR''—A'—NHAc and then to hydrolyse off the acyl group. Further, if desired, a terminal amino group may be modified, as by alkylation, conversion to a heterocyclic group such as piperidino or by bringing it into reaction with a halogeno-substituted amine Hal—A'''—NRR' such that A'—NH—A''' constitutes the linking group A.

Of the aminopyrimidine derivatives required as starting materials 2-ethylmercapto-4-amino-5-methylpyrimidine is known, having been made by reaction of ammonia with the corresponding 4-chloro compound, itself obtained by chlorination of the hydroxy derivative, made by interaction of S-ethyl isothiourea with ethyl formylpropionate (see American Chemical Journal, 1904, vol. 31, p. 591). 2-methylmercapto-4-amino-5:6-dimethylpyrimidine (B. P. 158°–159.5° C.) is similarly made by reaction of ammonia in ethanol at 115–125° C. for 6 hours with the 4-chloro compound (M. P. 35°–36° C.) itself obtained by reaction of phosphorus oxychloride on 2-methylmercapto-4-hydroxy-5:6-dimethylpyrimidine (for which see J. Amer. Chem. Soc., 1936, vol. 58, p. 769). 2-chloro-4-amino-6-methylpyrimidine is likewise known, having been made by fractionation of the product of reaction of ammonia in ethanol on 2:4-dichloro-6-methylpyrimidine (see Berichte, 1899, vol. 32, p. 2923). Other analogous starting materials suitable for use in the present invention may be made by methods essentially similar to those just described.

The following examples serve to illustrate the practice of the invention. The parts are by weight.

*Example 1*

5.6 parts of 4-amino-2-methylmercapto-5:6-dimethylpyrimidine and 8.6 parts of γ-diethylaminopropylamine are heated together in an autoclave at 200–210° C. for 22 hours. The excess of the amine is then distilled off under diminished pressure and the residue is distilled at $5 \times 10^{-4}$ mm. from a bath at 170–175° C. The distillate contains the desired product accompanied by a small amount of unchanged starting material. Repeated distillation under the same conditions, rejecting the lower boiling fractions, eliminates the unwanted starting material and 4-amino - 2 - γ - diethylaminopropylamino - 5:6-dimethylpyrimidine is obtained as a pale yellow oil. It forms a bis 3:5-dinitrobenzoate which crystallises from ethanol in pale yellow prisms of M. P. 210°–212° C.

The 4-amino-2-methylmercapto-5:6-dimethylpyrimidine required as starting material is made by interaction of ammonia in ethanol for 6 hours at 115°–125° C. with 4-chloro-2-methylmercapto-5:6-dimethylpyrimidine (M. P. 35°–36° C.), itself made by reaction of phosphorus oxychloride with the corresponding 4-hydroxy compound (for which see J. Amer. Chem. Soc., 1936, vol. 58, p. 769).

*Example 2*

8.5 parts of 4-amino-2-methylmercapto-5:6-dimethylpyrimidine and 23 parts of β-diethylamino ethylamine are heated together in an autoclave at 190–200° C. for 22 hours. The excess of the amine is then distilled off under diminished pressure and the residue is distilled at $2 \times 10^{-3}$ mm. from a bath at 200° C. The distillate is then crystallised from benzene whereby 4-amino-2 - β - diethylamino ethylamino-5:6-dimethylpyrimidine is obtained with M. P. 130°–131° C.

*Example 3*

4 parts of 2 - chloro-4-amino-6-methylpyrimidine and 20 parts of β-diethylamino ethylamine are heated together under reflux for six hours. There are then added 400 parts of water and a sufficiency of sodium hydroxide solution to make the mixture definitely alkaline and the unchanged diamine is distilled off in steam. The residue is acidified with concentrated hydrochloric acid and the solution is clarified with charcoal and filtered. The filtrate is made alkaline with sodium hydroxide and the base which separates as an oil is extracted with benzene. The benzene solution is dried and the solvent is distilled off. The residue solidifies on cooling and is crystallised from a mixture of benzene and petroleum ether (B. P. 60–80° C.). There is thus obtained 2-β-diethylamino ethylamino-4-amino-6-methylpyrimidine of M. P. 100–101° C.

*Example 4*

10 parts of 2-chloro-4-amino-6-methylpyrimidine and 50 parts of δ-diethylamino-α-methylbutylamine are boiled together under reflux for six hours. The mixture is then worked up as described in Example 3. The residue after removal of the benzene is distilled under diminished pressure whereby 4-amino - 2 - δ-diethylamino-α-methylbutylamino - 6 - methylpyrimidine is obtained as an oil of B. P. 152°–156° C. at 0.17 mm. It forms a dipicrate which crystallises from a mixture of ethanol and β-ethoxyethanol with M. P. 138–139° C.

*Example 5*

5 parts of 2-chloro-4-amino-6-methylpyrimidine and 20 parts of γ - diethylaminopropylamine are refluxed together for five hours. The excess of the diamine is then distilled off under diminished pressure and the oil which remains is dissolved in dilute hydrochloric acid. The solution is made alkaline by addition of caustic soda and the oil which is precipitated is extracted with benzene. The benzene solution is dried and the solvent is distilled off. The oil which remains is distilled in high vacuum. There is thus obtained 4-amino-2 - γ - diethylaminopropylamino-6-methylpyrimidine which is a pale yellow viscous oil. It forms a bis 3:5-dinitrobenzoate which crystallises from ethanol in pale yellow prisms M. P. 218°–220° C.

*Example 6*

5 parts of 2-chloro-4-amino-6-methylpyrimidine and 20 parts of γ-dibutylamino propylamine are heated together at 150–160° C. for six hours. The excess of diamine is then distilled off under diminished pressure and the oil which remains is dissolved in dilute hydrochloric acid. The solution is made alkaline with sodium hydroxide and the oil which is precipitated is extracted with ether. The ether solution is dried and the solvent is distilled off. The oil which remains is distilled at $4.5 \times 10^{-5}$ mm. from a bath at 200°–210° C. There is thus obtained 4-amino-2-γ-dibutylaminopropylamino - 6-methylpyrimidine in the form of a yellow oil. The bis 3:5-dinitrobenzoate crystallises from ethanol in pale yellow prisms, M. P. 200°–202° C. with charring.

*Example 7*

2 parts of 4 - amino - 2 - methylmercapto - 6 - methylpyrimidine and 2.6 parts of γ-dimethylaminopropylamine are heated together in an autoclave at 160–170° C. for 14 hours. The product is treated in the same way as is that of Example 1 and 4 - amino - 2 - γ - dimethylamino - propylamino - 6 - methylpyrimidine is obtained as a pale yellow viscous oil, B. P. 180–200° C. (bath temperature)/$10^{-4}$ mm., which does not crystallise. The bis - 3:5 - dinitrobenzoate crystallises from alcohol in pale yellow hygroscopic needles, M. P. 223–225° C.

We claim:

1. As new compounds, the pyrimidine derivatives of the formula

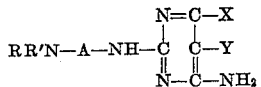

wherein R and R' are alkyl radicals of 1 to 4 carbon atoms each, A is a hydrocarbon linking group of not more than 3 carbon atoms, X is a lower alkyl radical and Y is a member selected from the group consisting of hydrogen and lower alkyl radicals.

2. As new compounds, the pyrimidine derivatives of the formula

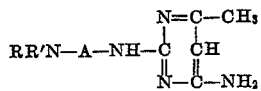

wherein R and R' are alkyl radicals of 2 to 4 carbon atoms each, while A is a hydrocarbon linking group of not more than 3 carbon atoms.

3. 4 - amino - 2 - $\gamma$ - dibutylaminopropyl - amino - 6 - methylpyrimidine.

4. 4 - amino - 2 - $\gamma$ - diethylaminopropyl - amino-6-methylpyrimidine.

5. 4 - amino - 2 - $\beta$ - diethylaminoethylamino - 6-methylpyrimidine.

ALBERT FREDERICK CROWTHER.
FRANCIS HENRY SWINDEN CURD.
BARBARA JEAN LOVELL.
HARRY TACON OPENSHAW.
ALEXANDER ROBERTUS TODD.

REFERENCES CITED

The following references are of record in the file of this patent:

Survey of Antimalarial Drugs 1941–1945, by Frederick Wiselogle.

J. W. Edwards, Ann Arbor, Mich. (1946), volume 2, part 2, pages 1426 and 1427.

Journal of the American Chemical Society, vol. 67 (1945), pages 1159–1161.

Chemical Abstracts, vol. 35, page 5791[9].